United States Patent [19]
Henderson et al.

[11] Patent Number: 6,114,993
[45] Date of Patent: Sep. 5, 2000

[54] METHOD FOR DETERMINING AND DISPLAYING THE POSITION OF A TRUCK DURING MATERIAL REMOVAL

[75] Inventors: Daniel E. Henderson, Washington; Craig L. Koehrsen, Peoria, both of Ill.

[73] Assignee: Caterpillar Inc., Peoria, Ill.

[21] Appl. No.: 09/035,222

[22] Filed: Mar. 5, 1998

[51] Int. Cl.[7] .............................. H04B 7/185; G01S 5/02
[52] U.S. Cl. .......................... 342/357.17; 37/414; 37/348
[58] Field of Search ....................... 342/357.17; 701/213; 37/414, 348

[56] References Cited

U.S. PATENT DOCUMENTS

| | | | |
|---|---|---|---|
| 4,516,116 | 5/1985 | White ....................................... | 340/685 |
| 5,105,896 | 4/1992 | Kyrtsos . | |
| 5,404,661 | 4/1995 | Sahm et al. ............................... | 37/348 |
| 5,850,341 | 12/1998 | Fournier et al. ......................... | 342/147 |
| 5,864,060 | 1/1999 | Henderson et al. .................... | 73/432.1 |
| 5,944,764 | 8/1999 | Henderson et al. ...................... | 701/50 |

OTHER PUBLICATIONS

Application No. 08/241305, filed May 10, 1994, "Method and Apparatus for Monitoring Material Removal Using Mobile Machinery".

Application No. 08/827429, filed Mar. 27, 1997, "Method for Monitoring the Work Cycle of Mobile Machinery During Material Removal".

*Primary Examiner*—Theodore M. Blum
*Attorney, Agent, or Firm*—W. Bryan McPherson

[57] ABSTRACT

In one aspect of the present invention, a method for determining and displaying a correlated position of a truck as it is being loaded by an earth moving machine is provided. The method includes the steps of receiving a loading event signal and then determining the correlated position of the truck in response to the loading event signal. The correlated position of the truck is then displayed relative to the land size.

In an alternative embodiment, a method for determining and displaying productivity information regarding material excavated by an earth moving machine and loaded into a truck is provided. The method includes the steps of determining the bucket load material type of the material loaded in the bucket. Productivity information is then displayed at a remote location in response to the bucket load material type.

37 Claims, 6 Drawing Sheets

METHOD FOR DETERMINING AND DISPLAYING THE POSITION OF A TRUCK DURING MATERIAL REMOVAL

TECHNICAL FIELD

This invention relates to the monitoring of material removal from a land site and, more particularly, to determining and displaying the position of a truck being loaded by an earth moving machine on a land site.

BACKGROUND

The process of removing material from land sites such as mines has been aided in recent years by the development of commercially available computer software for creating digital models of the geography or topography of a site. These computerized site models can be created from site data gathered by conventional surveying, aerial photography, or, more recently, kinematic GPS surveying techniques. Using the data gathered in the survey, for example point-by-point three-dimensional position coordinates, a digital database of site information is created which can be displayed in two or three dimensions using known computer graphics or design software.

Monitoring the excavation operations at a mining site is an important activity. Effective monitoring of the excavation operations will result in a more productive mine. Part of increasing the productivity of mining operations can be established by providing accurate displays visually indicating the activity that is occurring on the mine site. For example, currently the earthmoving machine may be shown on a display as it is operating on the mine site. The display may be located either on the machine, or at a central control facility. However, currently there is no method of displaying the relationship between the excavating machine and the truck being loaded during the mining operations. Displaying the relationship of the excavating machine and the loading truck is an important function that is needed by both an operator located on the excavating machine, and an operator or site manager located at the central control facility. An accurate display of the relationship of the truck and excavating machine in conjunction with a visual indication of the material type loaded in the truck would enable an operator or site manager to grasp a complete picture of the truck loading operation at a quick glance of the display. Providing productivity information, such as material type, in manner that may be rapidly understood, will increase the working efficiency of the land site by enabling accurate decisions to be made in a more rapid manner. Additionally, displaying the truck relative to the earth moving machine will enable a remote operator or site manager to quickly grasp the current status of a loading operation.

The present invention is directed to overcoming one more of the problems as set forth above by determining and displaying the position of the truck being loaded by the earthmoving machine.

DISCLOSURE OF THE INVENTION

In one aspect of the present invention, a method for determining and displaying a correlated position of a truck as it is being loaded by an earth moving machine is provided. The method includes the steps of receiving a loading event signal and then determining the correlated position of the truck in response to the loading event signal. The correlated position of the truck is then displayed relative to the land site.

In an alternative embodiment, a method for determining and displaying productivity information regarding material excavated by an earth moving machine and loaded into a truck is provided. The method includes the steps of determining the bucket load material type of the material loaded in the bucket. Productivity information is then displayed at a remote location in response to the bucket load material type.

BEST MODE FOR CARRYING OUT THE INVENTION

Figure 1:
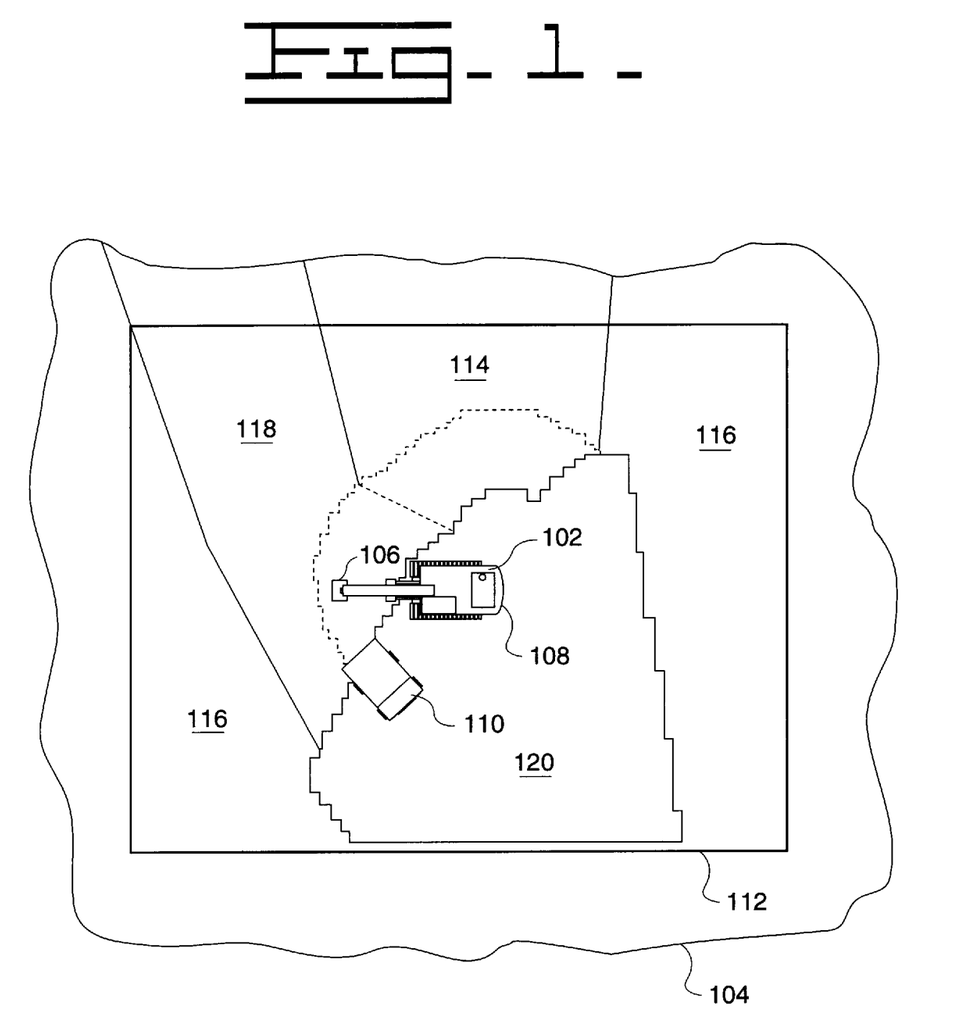
FIG. 1 is a high level diagram of a resource map displaying a land site, an earth moving machine, and a truck.

The present invention provides a method for determining and displaying a correlated position of a truck as it is being loaded by an earth moving machine. Referring to FIG. 1, an earth moving machine 102 is shown operating on a land site 104. The earth moving machine 102 is illustrated as an excavator 102, however, as will be discussed later, any type of material loading earth moving machine may be used. An excavator has a bucket 106, a body 108 that rotates about a fixed point of reference, and a base (not shown). The work cycle of the excavator 102 includes a loading operation that involves digging material, and a dumping operation that involves dumping the loaded material into a truck 110.

In one embodiment, the land site 104 may be depicted in a resource map 112 which may indicate the topography and type of material at a given location on the land site 104. A resource map 112 is a digitized site model of the land site 104, and in the preferred embodiment, is drawn on a display located either in the machine 102, or at a central control facility, or both. The land site 104 may be differentiated into ore type or grade regions 114, 116, and 118. Core samples taken over the land site 104 can be used to categorize and map the different types and locations of ore, as well as the different concentrations or grades within a given ore type, and are added to the digitized site model of the land site 104. Alternately, or additionally, the resource map 112 can be differentiated into different ore types, for example where two different mineral ores are present on a site 104.

As the excavator 102 traverses the land site 104 loading material, the resource map 112 is updated to indicate whether a location has been mined, and if so, updates the topography at the location. A location has been mined if all of the desired material from the location has been loaded. The mined region 120 may be illustrated on the resource map 112.

The ore material removed by the excavator 102 is transferred to a nearby transport truck 110. The loading and transfer of ore from the excavator 102 to the truck 110 occurs by the excavator body 108 rotating to a portion of the land site 104 that has not been mined. The excavator 102 then excavates ore material with the bucket 106. The operator of the excavator then causes the body 108 of the excavator 102 to rotate in a known fashion until the bucket 106 is positioned near a truck 110. The operator then dumps the bucket 106 into the truck 110. This process is repeated until the loading truck 110 has been loaded to the desired degree, for example four bucket loads. The truck 110 is then dispatched by either a central control facility (not shown), or the operator of the excavator 102, to transport the ore material to a suitable processing or stockpile location.

The excavator 104 is equipped with a positioning system (not shown). Examples of known three-dimensional positioning system with an external references which are suitable for the present invention include, but are not limited to, 3-D laser, GPS, GPS/laser combinations or UHF/VHF radio.

In the one embodiment the loading and dumping operation of the machine work cycle are determined using inputs from the positioning system, without additional sensors such as payload monitoring sensors, hoist and crowd and power sensors. For a machine 102 such as an excavator, the loading and dumping operation may be detected by monitoring the angular velocity of the body 108 of the earth moving machine 102. The angular velocity is determined by monitoring multiple position updates of the body as the body 108 rotates. In the preferred embodiment, the GPS antenna is located a known distance off center of the center of rotation of the body of the excavator 102. The rotation of the body 108 causes the GPS antenna to move along an arc relative to the center of rotation of the body 108. Therefore, utilizing multiple position updates the angular velocity of the body 108 may be determined. The angular velocity may then be used to determine when the body 108 is stopped, or at least within a predetermined threshold of being stopped. For example, when the excavator 102 is loading or dumping, the body 108 is stopped, or at least experiencing only small angular movements. The small angular movements may occur, for example, to readjust the bucket position. When the body 108 resumes rotating, the amount of time the body 108 was stopped is determined. In one embodiment the loading and dumping operation may be determined by the amount of time the body 108 was stopped. If the body 108 was stopped less than a predetermined amount of time, for example seven seconds, then the excavator 102 did not have time to load material and therefore must have been performing a dumping operation. If the body 108 was stopped longer than the predetermined amount of time then the conclusion may be made that the excavator loaded the bucket 106. However, additional information may be used based on the resource map 112 to increase the accuracy of the determination of the loading and dumping operation. If the body 108 is stopped over an area that has been mined, then the excavator 102 has performed a dumping operation. If the body 108 is stopped longer than a predetermined amount of time, e.g. seven seconds, and the body 108 is stopped over an area that has not been mined, then the excavator 102 is performing a loading operation.

In an alternative embodiment the loading and dumping operation are determined using inputs from the positioning system, in conjunction with additional sensors such as a payload monitoring system, in a manner well known in the art.

During the work cycle, it would be advantageous for the operator of the earthmoving machine 102, or the site manager at a central control facility, to have a display illustrating the position of the earthmoving machine 102 on the land site 104, and the position of the loading truck 110 relative to the earth moving machine 102. Throughout the description of the present invention, the operator referred to may be located on the earthmoving machine 102 itself, located at a central control facility (not shown), or both.

The present invention includes a method for determining and displaying the correlated position of the truck 110 as it is being loaded by an earth moving machine 102. The method of the present invention includes the steps of receiving a loading event signal, determining the correlated position of the truck 110 in response to the loading event signal, and displaying the correlated position of the truck 110 relative to the land site.

Figure 2:
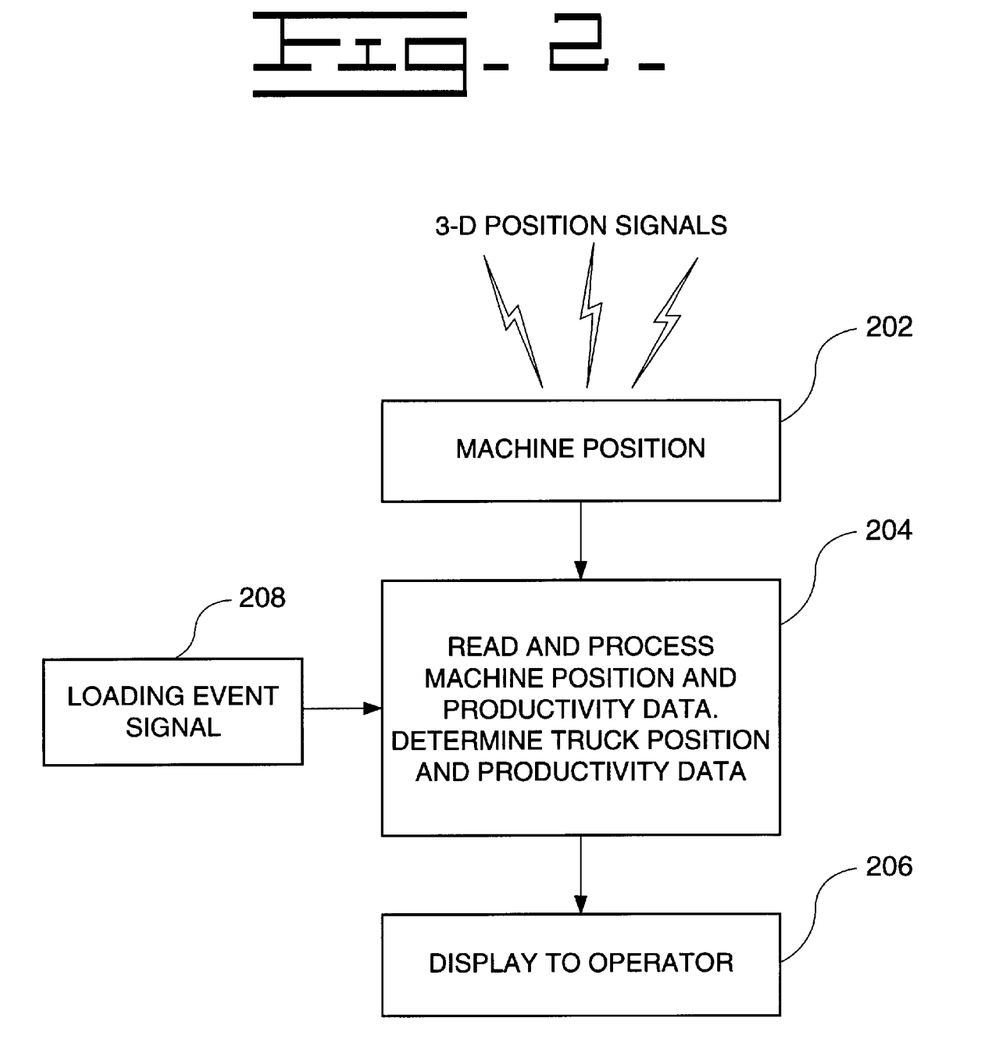
FIG. 2 is a schematic diagram of the present invention.

Referring now to FIG. 2, the method of the present invention is shown schematically. Using the positioning system, machine position coordinates are determined in block 202. A loading event signal is generated, either externally or on the earth moving machine 102, in block 208. The machine position and loading event signal may be used to determine the position of the truck 110 being loaded in block 204. In addition, productivity information is determined in block 204. The processing, i.e. hardware and software, needed to implement the present invention, which includes the productivity determinations made in block 204, may be located on the earth moving machine 102, or at a remote location. If the processing is located remotely then the relevant information will be sent to the remote location from the earth moving machine 102. Once the truck position and productivity information are determined, they are displayed to an operator or site manager. The display may be located either on the earth moving machine 102, or at a remote facility such as a central control facility.

Figure 3:
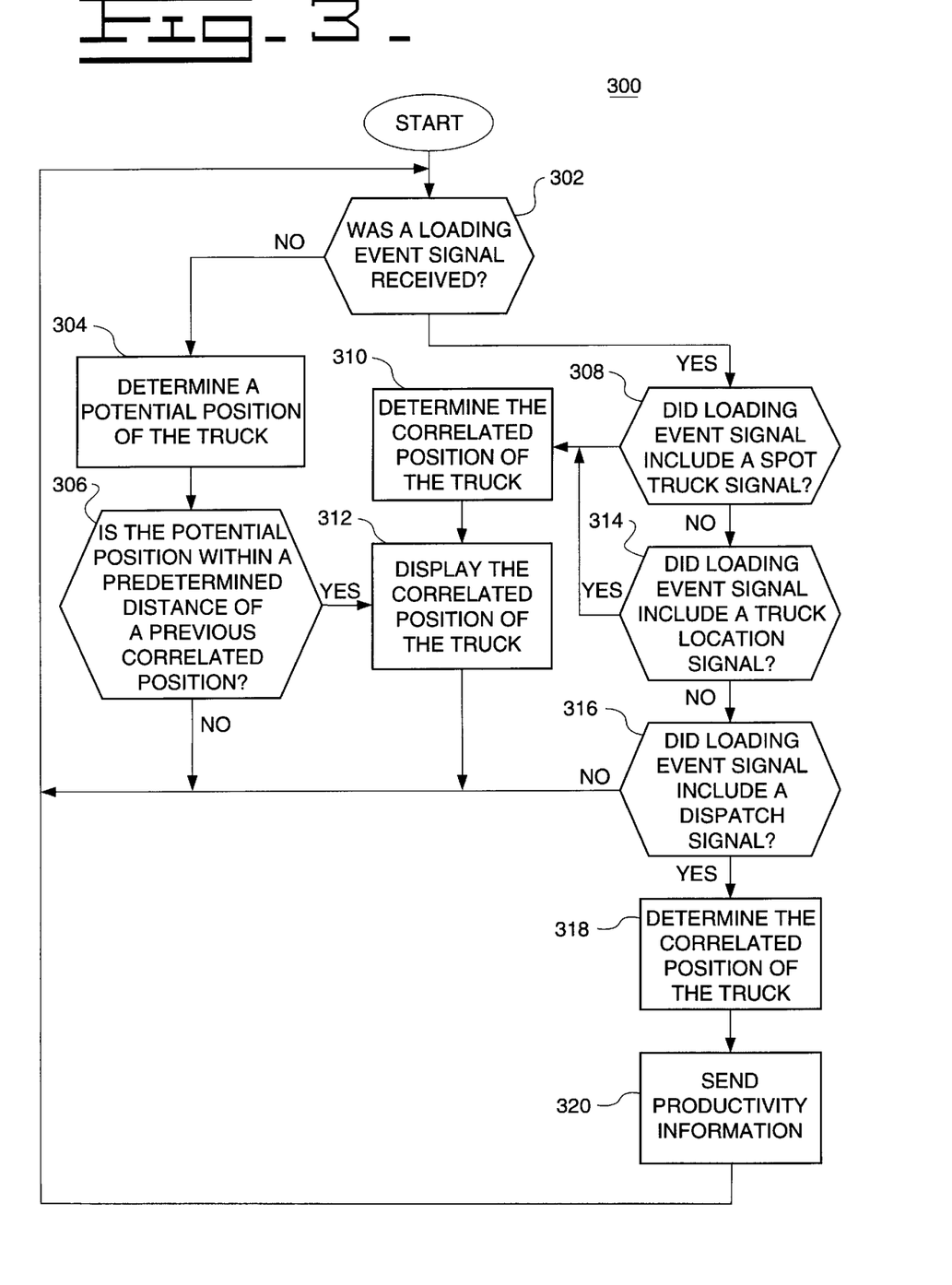
FIG. 3 is a flow diagram illustrating a method of the present invention.

The preferred embodiment of the method 300 of the present invention is illustrated in the flow diagram shown in FIG. 3. In a first decision block 302 a determination is made regarding whether a loading event signal has been received. A loading event signal includes at least one of a spot truck signal, a truck position signal or a truck dispatch signal. The spot truck, truck position, and truck dispatch signals will be described in more detail below. If a loading event signal has not been received, then control proceeds to a first control block 304 to determine a potential position of the truck 110.

When the earthmoving machine 102 is first turned on, the method 300 of the present invention has no prior knowledge of the position of the truck 110. In the preferred embodiment, each time a dumping operation is performed by the machine 102, the potential position of the truck 110 is determined.

Figure 4A:
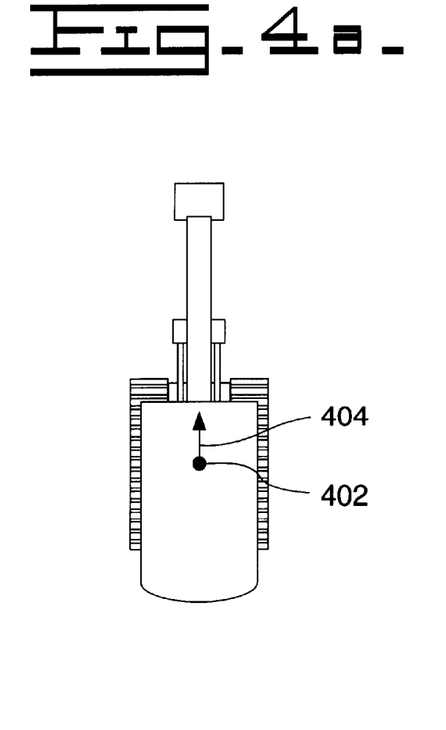
FIG. 4a–4c show diagram illustrating the loading position unit vector, truck position unit vector, and the scaled truck position unit vector.
Figure 4B:
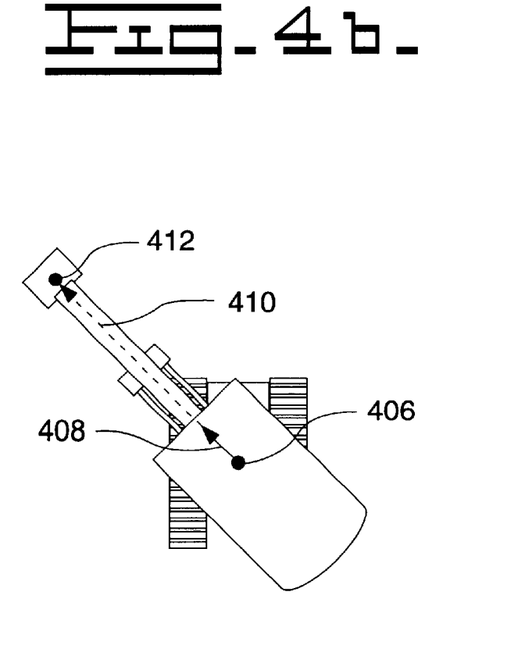
Figure 4C:
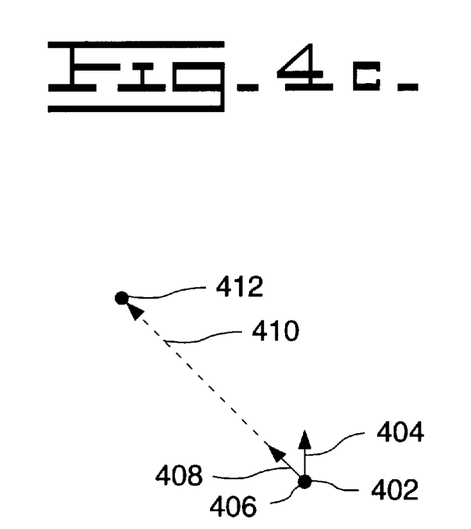

There are several methods that may be used to determine the potential position of the truck 110. In the preferred embodiment, when the angular velocity of the body indicates that the body 108 has stopped, the origin of the base of the machine 102 is stored, and the heading of the body is stored in memory. In an alternative embodiment, when a change of direction of the body 108 of the machine 102 occurs, the conclusion may be that the location of the change of direction indicates the occurrence of either a loading or dumping operation. If the method 300 determines a loading operation occurred at the location, then a unit vector is determined which points from the origin of the base of the machine 102 in the direction of the heading of the machine 102. as illustrated in FIGS. 4A–4C. This vector is labeled the load position unit vector 404, as illustrated in FIGS. 4A–4C. In addition, a potential load region is determined. In the case of an excavator 102, a potential load region may be defined as the area of the land site 104 extending away from the base in the direction of the heading of the body 108. The potential load region extends from the base towards the maximum extension of the bucket 106. The potential load region is as wide as the bucket 106. The potential load region is determined when a loading operation occurs.

If a dumping operation is detected, the potential position of the truck 110 is determined and stored. In the preferred embodiment, the potential position of the truck 110 is determined based on the heading of the body of the machine 102, and the origin 406 of the base of the machine 102 at the position where the dumping operation occurred, as illustrated in FIGS. 4A–4C. From the body heading, the unit vector 408 pointing from the origin of the machine 102 towards the truck 110 may be determined. This unit vector 408 is labeled the truck position unit vector 408. The unit vector 408 may then be scaled to form a scaled vector 410. The scaled vector 410 is used to determine the origin position 412 of the truck 110. That is, the origin of the truck 110 is determined to be at the end of the scaled vector opposite the origin of the earth moving machine 102. Once the potential position of the truck 110 is determined, the orientation is determined. The orientation of the truck 110 is determined by calculating an orientation vector that is perpendicular to the truck position vector 408, and pointing in a direction away from the loading position. The heading of the truck 110 is determined to be the same as the direction of the orientation vector.

The origin position of the truck 110 and the base of the machine 102, and the heading of the machine body 108 at the location of the dumping operation, are stored in memory. In addition, if a dumping operation is detected, the productivity information of the truck 110 is updated. The productivity information includes the type of material loaded in the bucket 106, the number of buckets loaded in the truck 110, a running count of the total number of buckets loaded by the excavator 102, and the overall material type of the contents in the bucket 106. The productivity information may be determined on the machine 102, or at a remote location such as the remote facility, or the truck 110 being loaded.

Once the potential position of the truck 110 is determined, control is passed to a second decision block 306 to determine if the potential position may be correlated with a previously correlated truck position. A previously correlated position is a position where the truck 110 has previously been determined to have been located. In the preferred embodiment, the previously correlated truck position is designated as either a Right Truck Position, or Left Truck Position depending on which side of the earthmoving machine 102 the previously correlated truck position was located.

Determining which side of the machine 102 the truck 110 is on may be done by taking the cross product of the truck position unit vector 408 and the load position unit vector 404. If the result is greater than zero then the truck 110 is on the right, otherwise the truck 110 is on the left.

For example, if there is a Right Truck Position designation, i.e., a previously correlated truck position located on the right side of the machine 102, then a determination is made regarding whether the current potential truck position and the Right Truck Position correlate. The correlation may be performed by comparing the origin of the potential truck position and the Right Truck Position designation, and if the origin of the potential truck is within a predetermined range, e.g. 5 meters, of the Right Truck Position designation then they are considered to be the same truck. In an alternative embodiment, the heading of the base of the machine 102 at the time the dumping operation occurred may be compared to the heading of the base of the machine 102 corresponding to the Right Truck Position designation. If the heading is within a predetermined amount, e.g. 2 degrees, then the potential truck position is determined to correlate with the Right Truck Position designation.

There may be a Right Truck Position designation and a Left Truck Position designation. The Truck Position designation also includes loading information associated with the truck 110. The Truck Position information includes the number of buckets associated with that truck, what material type each of the buckets included, and the overall material identification of the contents of the truck 110. The designation may include information regarding the origin of the potential load region. The designation may also include the origin of the machine base, and the heading of the machine body 108 at the time of the designation was made. Under normal operation only one truck 110 is loaded at a time on a land site. However the present invention supports loading multiple trucks concurrently. For example, the excavator may be loading a truck located on its right side, and one on its left side. The Truck Position designations support multiple trucks being loaded. If multiple trucks are being loaded on the same side of the excavator, multiple Right or Left Truck Position designations may be used at a time. The correlation step of control block 306 will ensure that the appropriate truck position designation is updated accordingly.

If a Right or Left Truck Position designation, i.e. a previous correlated truck position, may be correlated with the current potential position of the truck 110, then control proceeds to a second control block 312 to display the correlated position of the truck 110. In the second control block 312 a check is made to determine if the truck 110 is currently being displayed at the correlated position. If the truck 110 is not being displayed, then the truck 110 is displayed at the correlated position, and control returns to the first decision block 302. If the truck 110 is already being displayed, control will return to the first decision block 302.

Referring again to the second decision block 306, if the current potential position can not be correlated with a previously correlated position, or if there is no previously correlated position, then the potential position and associated material information is stored in memory, and control returns to the first decision block 302.

Referring again to the first decision block 302, if a loading event signal is received, then control proceeds to determine which of the three possible signals, spot truck, truck position, or dispatch truck, was included in the loading event signal. Therefore, control proceeds to a third decision block 308 to determine if a spot truck signal was received.

A spot truck signal is a signal generated by either the operator on board the earthmoving machine 102 or at the central control facility. A spot truck signal may be generated by the operator or site manager when they desire to manually indicate the position of the truck 110 on the display. The spot truck signal may be generated at any time during the work cycle. The position of the truck 110 is determined at the time the spot truck signal is received, based on the orientation of the earth moving machine 102 at the time the signal is received. When a spot truck signal is received, control passes to a third control block 310 to determine the correlated position of the truck 110. The correlated position is determined based on the heading of the body of the machine 102, and the origin 406 of the base of the machine 102 at the time the signal was received. As discussed earlier, from the body heading, the truck position unit vector 408 may be determined. The truck position unit vector 408 may then be scaled to form a scaled vector 410. The scaled vector 410 is used to determine the origin position 412 of the truck 110. The origin position of the truck 110 and the base of the machine 102, and the machine body heading at the location of the dumping operation, are stored in memory, along with the material information. Once the position is determined, the truck position is designated as either the Right or Left Truck Position, dependent upon which side of the excavator 102 the truck 110 is determined to be on. Once the position of the truck 110 is determined, the orientation is determined as described earlier.

In an example of the operation of spotting the truck 110, after the excavator 102 completes the dumping operation and the body 106 begins to rotate away from the position of the dumping operation to a loading position, the operator pushes a spot truck button (not shown). The spot truck button generates a loading event signal that contains the spot truck signal. The method 300 determines the position of truck based on the orientation of the body 108 of the machine 102 at the time the signal is received. Control then passes to the third control block 312 to draw the truck on the display. If the truck is already being displayed, the truck will be redrawn on the display at the newly correlated position as indicated by the spot truck signal. An icon of a truck is drawn on the display using the truck origin and orientation determined above, as shown on the resource map 112 of FIG. 1. Once the truck is drawn, control proceeds to the first decision block 302 to determine if another loading event signal has been received.

Referring to the third decision block 308, if the loading event signal did not include a spot truck signal, then control proceeds to a fourth decision block 314 to determine if the event signal included a truck position signal. A truck position signal is a signal generated by either the truck being loaded, or central control facility to indicate the position of the truck 110. For example, if a display is used on the excavator 102, then the loading truck signal may be generated by either the truck 110, or the central control facility. However, if a display is being used at the central control facility, the loading truck signal may be generated by either the truck, or the earthmoving machine 102 once the machine 102 determines the location of the truck 110. The truck position signal may be generated at any time during the work cycle. If a truck position signal was received control then proceeds to the third control block 310 determine the correlated position of the truck relative to the machine 102. The position of the truck is included in the truck position signal. However, if the orientation of the truck is not included in the truck position signal, then the orientation must be determined in the third control block 310. The orientation is determined as described above. The scaled truck position unit vector 410 is described as connecting the origin of the base of the machine 102 to the received truck position. The orientation of the truck is then determined by calculated in orientation vector that is perpendicular to the scaled truck position vector, and pointing in a direction away from the loading position. The heading of the truck is determined to be the same as the direction of the orientation vector. Control then proceeds to the first control block 312 to draw on icon of a truck on the display, at the position included in the loading truck signal.

If the loading event signal did not include a loading truck signal then control proceeds to a fifth decision block 316 to determine if the loading event signal included a dispatch truck signal. A truck dispatch signal is generated by the operator or site manager, either on the earth moving machine 102 or at the central control facility, to indicate when the truck 110 has been loaded to the desired amount. Once the truck is loaded to the desired amount, the truck 110 is dispatched to the appropriate location based upon the type of material contained in the truck 110.

When a truck dispatch signal is received control proceeds to a fourth control block 318 to determine the correlated position of the truck. In one embodiment, the position of the truck 110 is determined to be the most recent correlated truck position, i.e. the Right or Left Truck Position designation. In an alternative, the position of the truck 110 is determined to be the most recent potential truck position, as determined in the first control block 304. In an alternative embodiment, the position of the truck 110 is determined to be the most recent correlated truck position. The position is designated as the Right or Left Truck Position based upon the side of the excavator 102 the truck 110 is located. Once the truck position has been correlated, control proceeds to a fifth control block 320 to send the productivity information to the central control facility. Based on the productivity information the central control facility may determine the location to dispatch the truck. In the alternative, the productivity information may be delivered directly to the truck 110 so that a processing system on the truck 110 may determine where to take the load. In yet another alternative, the present invention may determine where to dispatch the truck 110 based on the productivity information.

The truck position is not immediately displayed in response to receiving a truck dispatch signal. In the preferred embodiment the truck position is erased from the display when a dispatch truck signal is received. Once the productivity information is delivered to the appropriate location, control returns to the first control block 302. The truck position will be displayed when the next potential truck position is determined, i.e. after the next dump operation, in accordance with the first control block 302 and the second decision block 304.

With regard to material identification information, when a loading operation is determined to have occurred, the potential load region is stored in memory. Each time a dumping operation occurs the productivity information of the truck 110 is updated. In the preferred embodiment the bucket load count for the truck 110 is updated. The average potential load region is updated to account for the most recent potential load region. Additionally an overall running bucket load total, indicative of the total number of buckets loaded by the machine 102, is incremented.

The current bucket material identification is determined based on the material covered by the potential load region. The current bucket material is determined to be the predominant material located in the potential load region.

When a dumping operation is performed, if the material identification for the current bucket load is the same as the material identification of the content of the truck 110, then the material identification of the truck 110 remains the same. If the material identification for the current bucket load is different from the material identification of the contents of the truck 110 then a determination is made as to the overall contents of the material in the truck 110. In the preferred embodiment, if there are more than one material identification types in the truck 110, then the material id that has the highest bucket count is determined to be the predominant material type of the truck. If there are equal bucket counts of two or more material types in the truck, then the most recent bucket load material identification will be determined to be the predominant material identification of the truck 110.

Once the productivity information is sent to the central control facility, the associated truck information regarding the Right or Left Truck Designation is cleared from memory, along with the stored productivity information of the dispatched truck. In addition the truck icon is then erased from the display, and control returns to control block 302 to begin determining the position of the next truck to be loaded, along with identification of the material contents.

In an alternative embodiment, once the potential position is determined in the first control block 304, the bucket load information, i.e. the type of material loaded by the bucket, may be delivered to a remote location where the material information is being stored and updated.

Figure 5:
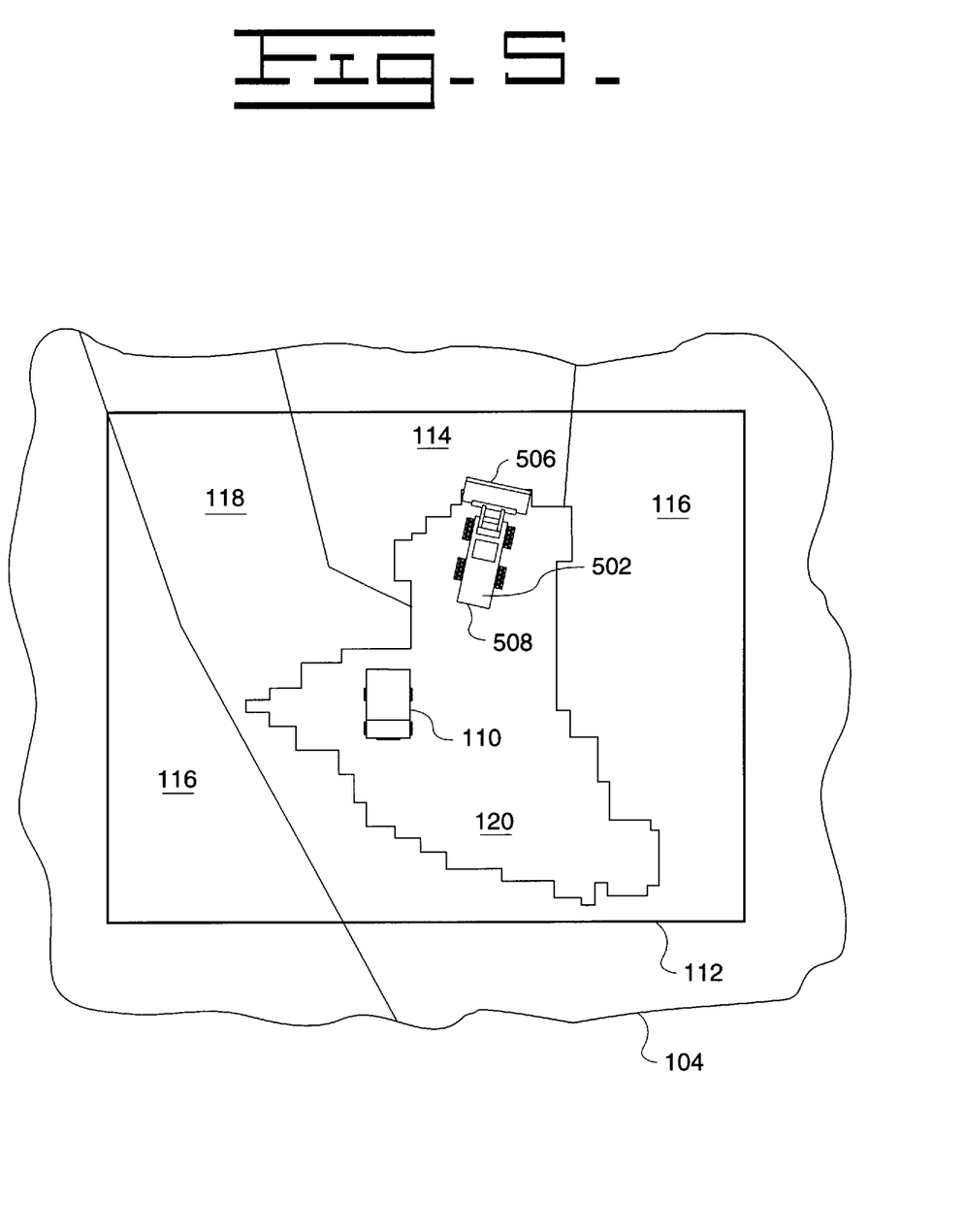
FIG. 5 is a high level diagram of a resource map displaying a land site, an earth moving machine, and a truck.

The present invention may also be implemented for earth moving machines such as a front end wheel loader 502, as shown in FIG. 5. The method for determining and displaying the position of a truck 110 being loaded by a wheel loader 502 is analogous to that for a excavator. The loading and dumping operation of a front end wheel loader 502 may be determined, in part, by monitoring for changes in direction of the wheel loader 502 from forward to reverse. In one embodiment the change in direction may be detected by using a transmission gear sensor (not shown) that will indicate whether the machine 102 is in a forward or reverse gear.

In the preferred embodiment, when the wheel loader 502 has made a forward to reverse transition, the position of the transition point is stored in memory. The position of the loader 502 is then monitored to ensure that loader 502 is not simply repositioning. Once the loader 502 has moved far enough away from the transition point, the transition point is correlated with the resource map of the land site 104 to determine if the potential load region of the wheel loader has been mined. The potential load region may be defined to cover the area of the land site 104 from the base of the wheels, or tracks, of the loader 502 out towards the maximum extension of the bucket. The width of the potential load region may be defined to be the width of the bucket 506. If the potential load region has not been mined, and the transition point is not located near a potential or known truck location, then the loader 502 is considered to have performed a loading operation at the transition point. Otherwise, the loader 502 is determined to have performed a dumping operation at the transition point. At the transition point where either a loading or dumping operation occurred, the origin and heading of the machine 502 is stored, and either a loading position or truck position unit vector is determined by calculating a unit vector pointing in the direction of the potential load region or potential truck position respectively, from the origin of the machine 502.

Referring again to the first control block 302 of FIG. 3, the potential truck position is determined to be at the transition point where the dumping operation occurred. The potential truck position is determined in the same manner described for the excavator, by determining a truck position unit vector point from the machine origin towards the truck 110. The truck position unit vector is then scaled by a predetermined scaling distance to determine the origin of the truck 110.

The orientation of the truck 110 is determined as before, by calculating an orientation vector that is perpendicular to the truck position vector 408, and pointing in a direction away from the loading position. The heading of the truck is determined to be the same as the direction of the orientation vector.

Determining which side of the loader 502 the truck 110 is on may be done by taking the cross product of the truck position unit vector 408 and the load position unit vector 404, analogously illustrated in FIGS. 4A–4C. If the result is greater than zero then the truck 110 is on the right, otherwise the truck 110 is on the left.

Control then passes to a second control block 304 to correlate the potential truck position. Correlation occurs in the same manner as described for the excavator. The remainder of the method 300 of operation illustrated in FIG. 3 is the same as described for excavator.

Figure 6:
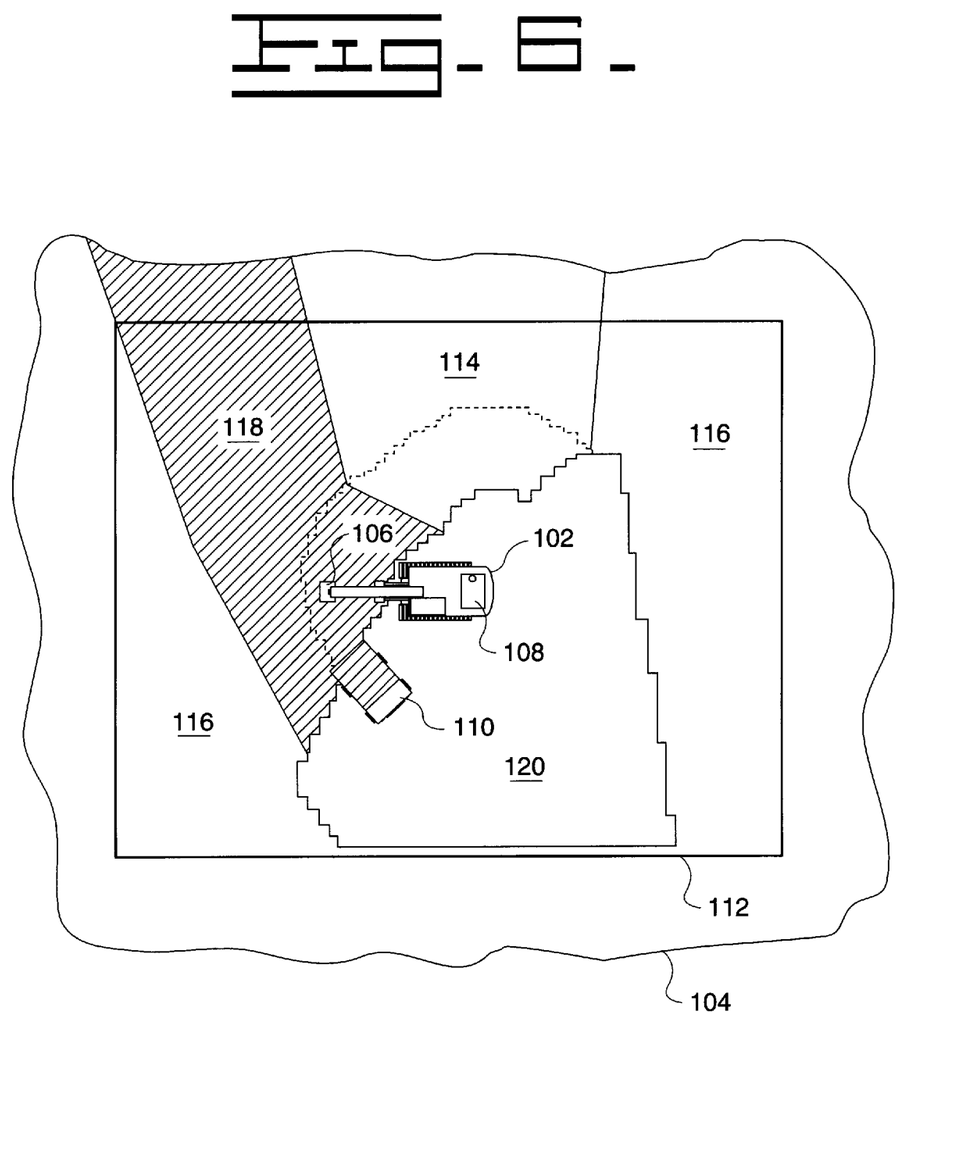
FIG. 6 is a high level diagram of one embodiment of a resource map displaying a land site, and earth moving machine, and a truck.

An additional feature of the present invention is the ability to color code the earthmoving machine 102 and truck 110 relative to the material content, during the loading and dumping operations. In the preferred embodiment, the resource map of the land site is color coded to indicate the differences in the type of material on the land site. When the machine 102 is determined to have performed a loading operation, a portion of the machine 102 is drawn in the same color as the material just loaded into the bucket. For example, if a wheel loader just loaded its bucket with material drawn as blue on the display, then the bucket of the wheel loader may be drawn as blue. Additionally, when the machine 102 dumps the material into the truck 110, the bucket 106 is redrawn in its original color, and the icon of the truck 110 is drawn in the color of the material loaded into the truck. For example, FIG. 6 illustrates a truck 110 that has been predominantly loaded with material from a load region 118 of the land site 104. FIG. 6 is illustrated with cross hatching, however, colors are easily substituted for the cross hatch. If multiple buckets of material have been loaded into the truck 110, the truck 110 may be drawn in the color of the predominant material contained in the truck 110. For example if the truck 110 contains one bucket of two different types of material, and a third bucket is added to the truck 110, the color of the truck 110 will be changed to indicate the color of the material having two bucket loads. If there is one bucket each of two different types of material, the truck 110 will be colored the same as the material that was last loaded into it. One advantage of color coding the machine 102 and the truck 110 to correspond to the type of material, is that the operator or site manager will be able to determine at a glance the material being loaded into the truck, and the overall material type loaded into the truck. The color coding will enable quicker decisions to be made regarding determining the location to have the truck dump the material, therefore increasing the overall productivity of the operation.

In the preferred embodiment the user interface (not shown) of the present invention includes a reset button and a material override button. The reset button is used by the operator or site manager if for any time during the operation of the present invention they want to clear the current truck loading information, and reset the system to control block 302 illustrated in FIG. 3. The material override button may be used by the operator or site manager to manually input the material identification for the material in a particular truck. Once the material is manually selected, the material identification for that particular truck will not change again unless the material override button is again selected.

The truck 110 and loading machine 102 may be manned or autonomous for the present invention to be used. If the loading machine 102 is autonomous the site manager located in the central control facility will be the primary user of the invention.

The present invention is embodied in a microprocessor based system (not shown) which utilizes arithmetic units to control process according to software programs. Typically, the programs are stored in read-only memory, random access memory or the like. The method 300 disclosed in the present invention may be readily coded using any conventional computer language.

INDUSTRIAL APPLICABILITY

The present provides a method for determining and displaying the correlated position of a truck 110 as it is being loaded by an earth moving machine 102. The work cycle of the machine 102 includes loading material from the land site into a bucket, and then dumping the bucket 106 into the truck 110. Once the truck 110 is loaded to the desired level, the truck 110 is dispatched to the appropriate location based on the type of loaded material. Each time the machine 102 dumps material into the truck 110, the potential position of the truck 110 is determined.

During the work cycle the machine 102 will receive a loading event signal. The loading event signal will include a spot truck signal, truck position signal, or a truck dispatch signal. The spot truck signal is used by an on-board or off-board operator when the operator would like to manually indicate the location of the truck 110 and have the truck 110 displayed. The truck position signal is a signal generated by the truck 110 itself, the central control facility, or possibly even the earth moving machine 102 depending on the configuration being used. The truck position signal indicates the present position of the truck. The truck 110 will be drawn at the location of the truck position signal. The truck dispatch signal is a signal that is generated when the truck has been loaded to the desired amount. The truck dispatch signal will lead to the truck being displayed if the position of the next truck that arrives for loading correlates with the position of the truck that has just been loaded.

The present invention includes displaying productivity information at a remote location in response to said bucket load material type loaded into the truck. When a bucket load is excavated the present invention determines the material type that has been loaded. When a bucket load is dumped into the truck, the present invention updates the material information regarding the contents of the truck. In one embodiment updating the material information involves sending the bucket load information to a remote location, such as a central control facility or the truck itself. Then, at the remote location the material information update is performed. In an alternative embodiment, updating the material information occurs on the earth moving machine 102. The material information includes the number of bucket loads in the truck 110, the overall type of material loaded in the truck 110, and a running count of the total number of bucket loads performed by the earth moving machine 102.

The material information is shown on a display. The display may be located on the earth moving machine 102, or at a remote control facility. In the preferred embodiment the position of the truck 110 and the earth moving machine 102 are displayed, as illustrated in FIGS. 1, 5, and 6. Each material type of the land site has a designated color. When the machine loads the bucket, the bucket changes color to the designated color of the material. When the bucket is dumped into the truck the bucket is redrawn in its original color, and the truck 110 is now drawn in the designated color of the predominant material that has been loaded. In the preferred embodiment the location the truck 110 is dispatched is determined based on the color of the truck 110 at the time of the dispatch. Automatic or manual dispatch may be facilitated by determining the current color designation of the truck 110 and dispatching accordingly. In an alternative embodiment the material information is illustrated on the display either in text, or color symbols. The material information is then used to dispatch the truck.

The ability to determine and display the truck position, and also to graphically represent the contents of the truck will enhance the effectiveness of operations at a mining site.

Other aspects, objects and advantages of the present invention can be obtained from a study of the drawings, the disclosure and the appended claims.

We claim:

1. A method for determining and displaying a correlated position of a truck as it is being loaded by an earth moving machine having a bucket, said earth moving machine being located on a land site having at least one type of material, comprising the steps of:

receiving a loading event signal;

determining said correlated position of the truck in response to said loading event signal, said correlated position including an orientation of said truck; and, displaying said correlated position of the truck relative to the land site.

2. A method as set forth in claim 1 wherein the step of determining said correlated position of the truck further includes the steps of:

determining a potential load region;

determining a potential dumping position of said earth moving machine; and, and determining an orientation of the truck in response to said potential load region and said potential dumping position.

3. A method as set forth in claim 2 further comprising the step of determining a potential position of the truck, wherein the step of determining said correlated position further comprises the step of determining said correlated position of the truck in response to said potential position and said loading event signal.

4. A method as set forth in claim 2 further comprising the step of determining a position of the earth moving machine, wherein the step of determining said correlated position further comprises the step of determining said correlated position of the truck in response to said earth moving machine position and said loading event signal.

5. A method as set forth in claim 3, wherein said step of determining said potential truck position, further includes determining said potential truck position in response to said dumping position.

6. A method as set forth in claim 5 wherein said loading event signal includes one of a spot truck signal, a truck dispatch signal, and a truck location signal.

7. A method as set forth in claim 3, wherein said earth moving machine has a body, said body being adapted to rotate about a fixed point of reference, and the step of determining said potential position further comprises the steps of:

determining an angular velocity of the body;

determining the body stopped in response to said angular velocity being less than a predetermined amount;

determining the duration of time the body is stopped;

determining at least one of a loading and a dumping operation in response to said duration of time; and determining a potential load region of said body, said potential load region being located where the body stopped.

8. A method as set forth in claim 3, wherein the step of determining a potential position of said earth moving machine further comprises the steps of:

determining the earth moving machine has transitioned from a forward to a reverse direction; and determining a potential load region of said bucket, said load region being located where said forward to reverse direction transition occurred.

9. A method as set forth in claim 2, wherein the step of determining a potential position of the truck further includes the step of determining a material information of the material in the truck, said material information including a material type of the material in the truck.

10. A method as set forth in claim 9, wherein the step of displaying said actual position of the truck further includes the step of displaying said material information of the loaded truck.

11. A method as set forth in claim 10, wherein the step of displaying said truck includes the steps of:

associating a color to each material type;

displaying a portion of the truck in a color indicative of the material type in the truck.

12. A method as set forth in claim 11, further including the steps of:

determining the material type of the current bucket load of the earthmoving machine; and, displaying a portion of the earthmoving machine in a color indicative of the material type in the bucket.

13. A method as set forth in claim 6, wherein said loading event signal is equal to said truck dispatch signal, further including the steps of:

identifying a truck material information; and, delivering said truck material information to a central control facility.

14. A method as set forth in claim 1, wherein said displaying occurs at one of the earthmoving machine and a central control facility.

15. A method as set forth in claim 2, further including the steps of:

determining a bucket load material type of said bucket; and, delivering said bucket load material type to a remote facility.

16. A method as set forth in claim 2, further including the steps of:

determining a truck load material type of said truck; and, delivering said truck load material type to a remote vehicle.

17. A method as set forth in claim 9, further including the steps of:

determining the bucket is loaded;

displaying a portion of the earthmoving machine in a first color when the bucket is empty, and a second color when the bucket is loaded;

displaying a portion of the truck in a third color when it is empty and a fourth color when it contains at least one bucket load.

18. A method as set forth in claim 17, including the step of determining the location to dispatch the loaded truck in response to the color of the fourth color.

19. A method for determining and displaying productivity information regarding material excavated by an earth moving machine and loaded into a truck, the earth moving machine having a bucket, said earth moving machine being located on a land site having at least one type of material, comprising the steps of:

determining an occurrence of a loading operation, said operation including loading material into the bucket;

determining a bucket load material type of the material loaded in the bucket;

determining an occurrence of a dumping operation, said operation including dumping material into said truck;

determining a position of said truck in response to said loading position and said dumping position, said position including a truck origin and a truck orientation;

determining a predominate material type dumped into said truck, said material having an associated material color; and, displaying said truck position, relative to said earth moving machine, in said associated material color.

20. A method, as set forth in claim 19, further comprising the step of displaying productivity information at a remote location in response to said bucket load material type.

21. A method as set forth in claim 20, further including the steps of:

determining the bucket is loaded;

displaying a portion of the earthmoving machine in a first color when the bucket is empty, and a second color when the bucket is loaded;

displaying a portion of the truck in a third color when it is empty and a fourth color when it contains at least one bucket load.

22. A method as set forth in claim 21, further including the steps of:

determining a bucket load material type of said bucket; and, delivering said bucket load material type to a remote facility.

23. A method as set forth in claim 21, further including the steps of:

determining a truck load material type of said truck; and, delivering said truck load material type to a remote vehicle.

24. A method as set forth in claim 20, further including the steps of:

determining the material type of the current bucket load of the earthmoving machine; and, displaying a portion of the earthmoving machine in a color indicative of the material type in the bucket.

25. A method of determining a position of a truck as it is being loaded by an earth moving machine having a bucket, said earth moving machine being located on a land site having at least one material type, comprising the steps of:

determining a loading position of said earth moving machine;

determining a dumping position of said earth moving machine;

determining a truck origin in response to said dumping position;

determining a truck orientation in response to said loading position and said dumping position; and, displaying said truck position, including said truck origin and said truck orientation, relative to the earth moving machine.

26. A method, as set forth in claim 25, wherein the step of displaying said truck position further comprises the step of displaying a figure indicative of a truck, at said truck position.

27. A method, as set forth in claim 26, wherein the step of determining a loading position further comprises the steps of:

determining when a loading operation occurs; and determining said earth moving machine loading position in response to said loading operation, said loading position including a machine origin and a machine heading.

28. A method, as set forth in claim 27, wherein the step of determining a dumping position further comprises the steps of:

determining when a dumping operation occurs; and determining said earth moving machine dumping position in response to said dumping operating, said dumping position including a machine origin and a machine heading.

29. A method, as set forth in claim 28, further comprising the steps of:

determining a side of said earth moving machine that said truck is positioned in response to said dumping position and said loading position; and, correlating said truck position.

30. A method, as set forth in claim 29, wherein said side is one of a right side and a left side, and wherein the step of correlating said truck position further comprises the step of comparing said truck position with a previous truck position on said determined side.

31. A method, as set forth in claim 25, further comprising the steps of:

determining a predominate material type dumped into said truck, said material having an associated material color; and, displaying a portion of said truck, relative to said earth moving machine, in said associated material color.

32. A method, as set forth in claim 31, further comprising the step of determining the location to dispatch the loaded truck in response to the color of the displayed truck portion.

33. A method, as set forth in claim 25, wherein said displaying occurs at one of the earthmoving machine and a central control facility.

34. A method as set forth in claim 25, further including the steps of:

determining the bucket is loaded;

displaying a portion of the earthmoving machine in a first color when the bucket is empty, and a second color when the bucket is loaded;

displaying a portion of the truck in a third color when it contains at least one bucket load.

35. An apparatus adapted to determine a position of a truck as it is being loaded by an earth moving machine having a bucket, said earth moving machine being located on a land site having at least one material type, comprising:

a controller adapted to determine a loading position and a dumping position of said earth moving machine, determine a truck origin in response to said dumping position, determine a truck orientation in response to said loading position and said dumping position, determine a side of said earth moving machine that said truck is positioned in response to said dumping position and said loading position, and generate a truck position signal; and a display adapted to receive said truck position signal and display said truck position, including said truck origin and said truck orientation, relative to the earth moving machine.

36. An apparatus, as set forth in claim 35, wherein said controller is further adapted to determine a predominate material type dumped into said truck, said material having an associated material color, said truck position signal including said color, and wherein said display is further adapted to display a portion of said truck, relative to said earth moving machine, in said associated material color.

37. An apparatus, as set forth in claim 36, wherein said controller is further adapted to determine when the bucket is loaded, determine the predominate material type in said bucket, associate a material color to said machine in response to said predominate material type, and generate an earthmoving machine signal, said machine signal including said machine associated material color; and wherein said display is further adapted to receive said machine signal and display a portion of the earthmoving machine in said machine material color, enabling a portion of the machine to be displayed in a first color when the bucket is empty, and a second color when the bucket is loaded.

* * * * *